US009736173B2

(12) United States Patent
Li et al.

(10) Patent No.: US 9,736,173 B2
(45) Date of Patent: Aug. 15, 2017

(54) DIFFERENTIAL DEPENDENCY TRACKING FOR ATTACK FORENSICS (71) Applicant: NEC Laboratories America, Inc., Princeton, NJ (US)

(72) Inventors: Zhichun Li, Princeton, NJ (US); Zhenyu Wu, Plainsboro, NJ (US); Zhiyun Qian, Franklin Park, NJ (US); Guofei Jiang, Princeton, NJ (US); Masoud Akhoondi, Princeton, NJ (US); Markus Kusano, Princeton, NJ (US)

(73) Assignee: NEC Corporation, Tokyo (JP)

( * ) Notice: Subject to any disclaimer, the term of this patent is extended or adjusted under 35 U.S.C. 154(b) by 75 days.

(21) Appl. No.: 14/879,876

(22) Filed: Oct. 9, 2015

(65) Prior Publication Data
US 2016/0105454 A1 Apr. 14, 2016

Related U.S. Application Data (60) Provisional application No. 62/062,298, filed on Oct. 10, 2014.

(51) Int. Cl.
*G06F 21/55* (2013.01)
*H04L 29/06* (2006.01)
*G06F 17/30* (2006.01)

(52) U.S. Cl.
CPC .... *H04L 63/1416* (2013.01); *G06F 17/30958* (2013.01); *H04L 63/1425* (2013.01); *H04L 63/1441* (2013.01); *H04L 2463/146* (2013.01)

(58) Field of Classification Search
CPC . G06F 21/552; G06F 21/554; H04L 63/1416; H04L 63/1425
See application file for complete search history.

(56) References Cited

U.S. PATENT DOCUMENTS

| 7,386,752 | B1 | 6/2008 | Rakic et al. | |
| 2008/0114581 | A1* | 5/2008 | Meir | H04L 12/66 703/13 |
| 2013/0097183 | A1 | 4/2013 | McCracken | |
| 2013/0097463 | A1* | 4/2013 | Marvasti | G06F 11/079 714/47.1 |
| 2015/0106324 | A1* | 4/2015 | Puri | G06N 5/04 706/52 |

OTHER PUBLICATIONS

Chiueh, et al., "Design, Implementation, and Evaluation of a Repairable Database Management System", ACSAC, Computer Security Applications Conference, Dec. 2004, 10 pages.

(Continued)

*Primary Examiner* — David Pearson
(74) *Attorney, Agent, or Firm* — Joseph Kolodka (57) ABSTRACT Methods and systems for intrusion attack recovery include monitoring two or more hosts in a network to generate audit logs of system events. One or more dependency graphs (DGraphs) is generated based on the audit logs. A relevancy score for each edge of the DGraphs is determined. Irrelevant events from the DGraphs are pruned to generate a condensed backtracking graph. An origin is located by backtracking from an attack detection point in the condensed backtracking graph.

12 Claims, 7 Drawing Sheets (56) References Cited

OTHER PUBLICATIONS

King et al., "Backtracking Intrusions", SOSP, ACM Symposium on Operating System Principles, Oct. 2003, 14 pages.

King et al., "Enriching Intrusion Alerts Through Multi-host Causality", Proceedings of the 2005 Network and Distributed System Security Symposium (NDSS), Feb. 2005, 12 pages.

Kim, et al., "Intrusion Recovery Using Selective Re-execution", Proceeding OSDI'10 Proceedings of the 9th USENIX Conference on Operating Systems Design and Implementation, Oct. 2010, 16 pages.

Lee, et al., "High Accuracy Attack Provenance via Binary-based Execution Partition", Internet Society, Apr. 2013, 16 pages.

* cited by examiner

DIFFERENTIAL DEPENDENCY TRACKING FOR ATTACK FORENSICS

RELATED APPLICATION INFORMATION

This application claims priority to provisional application Ser. No. 62/062,298 filed on Oct. 10, 2014, incorporated herein by reference.

BACKGROUND

Technical Field

The present invention relates to computing system security management, and, more particularly, to enterprise data security management using differential dependency tracking for attack forensics.

Description of the Related Art

Conventionally, enterprises have protected their computing systems by attempting to prevent access of attackers using perimeter defenses (e.g., firewalls, intrusion prevention systems (IPSs), etc.). However, given the sophistication of modern attacks (e.g., drive-by download, phishing emails, contaminated mobile devices, insider attacks, etc.), successful intrusions and compromises are almost unavoidable in an enterprise. For example, there have recently been several high profile data breaches at several large, international corporations. As such, in the real world, the fundamental assumption that enterprise security management may be performed simply by preventing attackers from entering into an enterprise no longer holds true.

Intrusion recovery and intrusion detection have become increasingly used for enterprise security management, and may include, for example, ubiquitous monitoring of devices in an enterprise, backtracking the origin of intrusions, or estimating impact of an attack. With respect to backtracking, once an intrusion is detected, backtracking the intrusion traces the actions of intruders to identify how they entered the system. This helps system administrators identify and patch the root causes of the intrusion and strengthen the enterprise's security.

A key challenge in backtracking is the increasing complexity of modern enterprise systems. The complexity introduces a plethora of dependencies among different components and applications across the enterprise. Conventional systems and methods for backtracking attacks incorrectly filter out certain attack-related events (e.g., removing hub files, removing pipes, removing read-only files, etc.), and are unable to sufficiently reduce the size (e.g., transform/condense received data) of backtracking graphs for effective analysis of the attack, as conventional systems and methods are unable to effectively and accurately detect and/or prune away resources unrelated to attacks to generate an accurate and concise backtracking graph.

SUMMARY

A computer-implemented method for intrusion attack recovery includes monitoring two or more hosts in a network to generate audit logs of system events. One or more dependency graphs (DGraphs) is generated based on the audit logs. A relevancy score for each edge of the DGraphs is determined. Irrelevant events from the DGraphs are pruned to generate a condensed backtracking graph. An origin is located by backtracking from an attack detection point in the condensed backtracking graph.

A system for intrusion attack recovery includes a remote host monitor configured to monitoring two or more hosts in a network to generate audit logs of system events and to generate one or more dependency graphs (DGraphs) based on the audit logs A relevance determiner comprising a processor is configured to determine a relevancy score for each of a plurality of edges of the DGraphs and to pruning irrelevant events from the DGraphs to generate a condensed backtracking graph. A backtracker is configured to backtrack from an attack detection point in the condensed backtracking graph to locate an origin.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a system and method for enterprise security management using differential dependency tracking. In a particularly useful embodiment, to facilitate intrusion recovery within enterprises, tracking the dependencies between Operating System (OS) resources (e.g., processes, files, etc.), may be performed to identify the provenance (e.g., identity, location, etc.) of an attack, and may include backtracking from an attacks origin to analyze (e.g., identify, locate, prevent future attacks, etc.) the propagation of the attack within and across hosts in, for example, an enterprise network of interconnected computers according to the present principles.

In one embodiment, received data (e.g., data related to system process across all hosts in an enterprise) may include an unmanageable amount of data (e.g., included all system processes, files, resources, minor attacks, etc.), and in turn, any resulting graphs of the received data for backtracking analysis (e.g., by a computing system, human administrator, etc.) may include nodes and/or edges for simple attacks and/or resources unrelated to the attacks.

Thus, the present principles may be employed to condense the received data by, for example, pruning resources (e.g., from the received data) determined to be unrelated to an attack (e.g., from a dependency graph (DGraph)) to reduce computational demands on a processor (e.g., hardware processor), thereby increasing the overall system speed for intrusion detection and/or backtracking according to various embodiments of the present principles. It is noted that in some embodiments, the received data and/or generated DGraph may be condensed and/or pruned to generate a simplified backtracking graph so that a human administrator may sufficiently comprehend and employ the backtracking graph for attack detection and prevention according to the present principles.

In one embodiment, the present principles may be employed to automate pruning techniques on inter-resource DGraphs to improve backtracking speed, and performance of a plurality of nodes of interconnected computers in a network (e.g., enterprise intranet). In one embodiment, system call events from all hosts in an enterprise may be collected, and a reference model of baseline events may be built. This model may be employed to optimize the backtracking analysis by filtering non-attack related events (e.g., resources, files, functions, etc.), which significantly reduces the amount of data analyzed as well as the size of generated backtracking graphs as compared to conventional systems and methods without pruning out resources affected by attacks according to the present principles.

The complexity of enterprise systems (e.g., dependencies among different components and applications across a plurality of hosts/nodes in an enterprise) generally result in unacceptably large backtracking graphs representing the complex enterprise architecture. These use of these large backtracking graphs to detect and/or track attacks is too complex for human to comprehend (e.g., because of the complexity of the enterprise systems). A reason the backtracking graphs may be so large is that they may include a detected intrusion as their root, and include all other resources in the enterprise on which a compromised resource is logically dependent.

In DGraphs of enterprise systems, most of the graph components may represent activities completely unrelated to the attack. Therefore, a goal of backtracking according to embodiments of the present principles is to determine which components (e.g., resources, files, etc.) can be safely excluded without compromising accuracy of attack detection/tracking. However, since conventional systems depend on domain knowledge based heuristics, they often fail to filter a large fraction of irrelevant dependencies and/or incorrectly filter intrusion attacks.

In one embodiment, dependencies unrelated to an intrusion may be automatically removed by leveraging benign execution behavior prior to the intrusion according to the present principles. A backtracking graph may be employed to determine how an attack occurred, where an attack came from, etc., and the graph may be employed to highlight any differences between the attack and normal system behavior to illustrate, for example, an attack path.

In one embodiment, the backtracking problem may be formulated as a delta dependency tracking method (hereinafter "DeltaTrack"). To determine the differences of related dependencies to normal behavior according to the present principles, the following assumptions may be made: (1) in most attack forensic cases, the majority of the hosts inside the enterprise have not been compromised; and (2) enterprise systems have a large number of hosts that are similar to each other, therefore it is possible to establish a baseline on what activities are considered common among them.

Therefore, in one embodiment, the common behaviors on all the monitored hosts within an enterprise may be mined to establish the baseline. As more host and monitoring data is received as input to the system, the accuracy of the baseline reference model generated continues to improve. By employing such a reference model, the present principles do not rely on any domain knowledge based heuristics (as conventional systems do), and thus are general (e.g., applicable to all types of systems and networks). In some embodiments, all hosts are continuously monitored, and as such, the reference model can dynamically and automatically adapt to any changes (e.g., evolving software, removed dependencies, etc.) according to the present principles.

Furthermore, in some embodiments, the following assumptions may be employed for identification of attack relevant events according to the present principles: (1) behaviors which occur frequently amongst all hosts in the hosts in the enterprise are not likely relevant to the attack; and (2) an attack usually generates some rare behavior.

Figure 1:
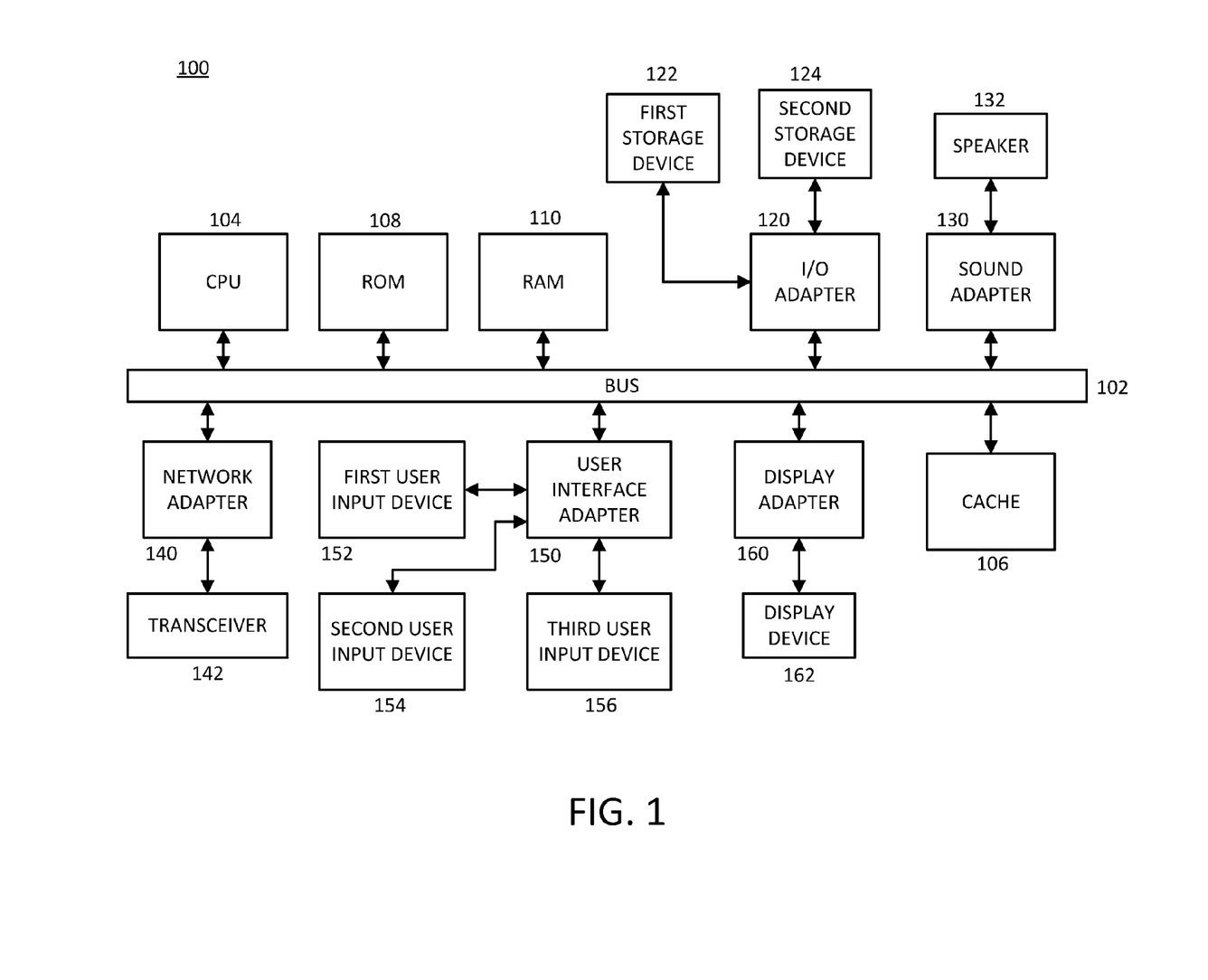
FIG. 1 shows an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 4:
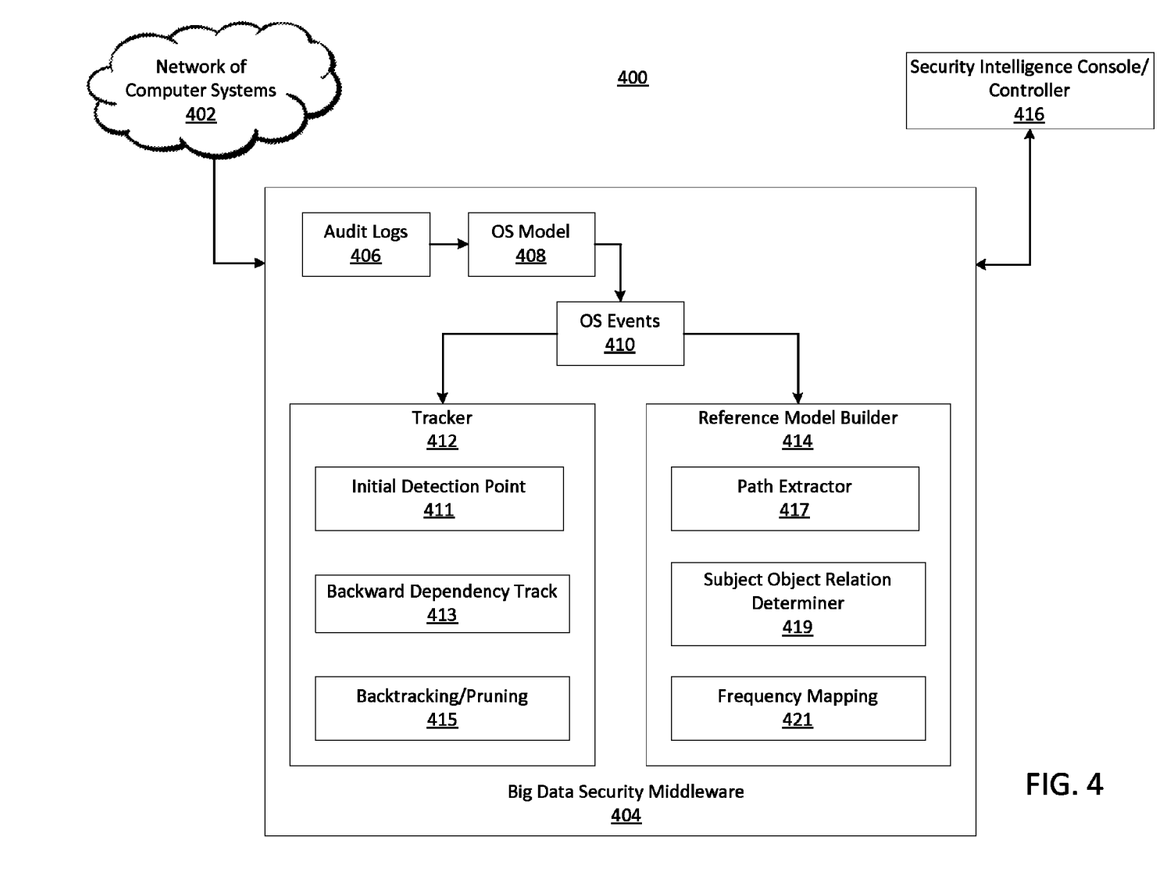
FIG. 4 shows an exemplary system/method for computer system security management using differential dependency tracking for a plurality of hosts in an enterprise, in accordance with an embodiment of the present principles.
Figure 6:
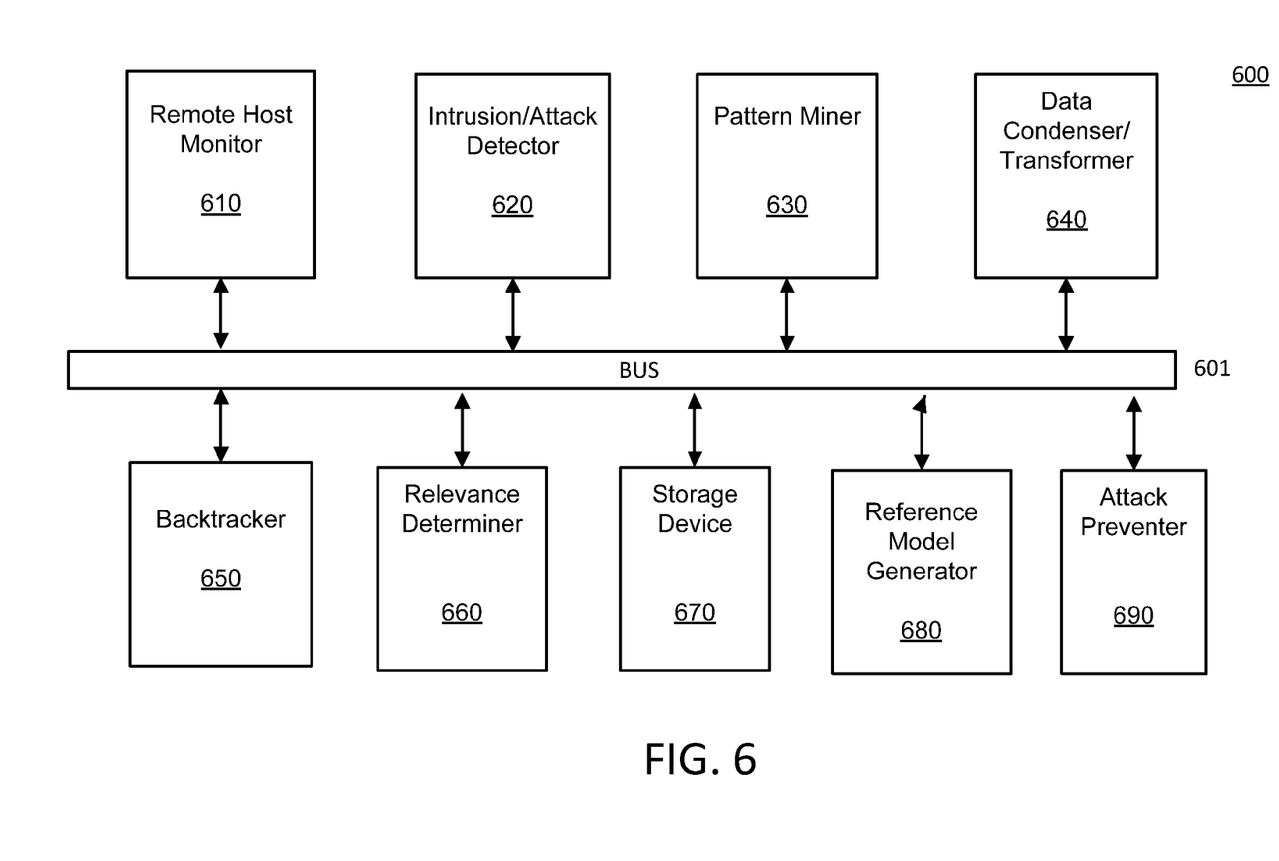
FIG. 6 shows an exemplary system for computer system security management using differential dependency tracking for a plurality of hosts in an enterprise, in accordance with an embodiment of the present principles.

Moreover, it is to be appreciated that circuits/systems/networks 400 and 600 described below with respect to FIGS. 4 and 6 are circuits/systems/networks for implementing respective embodiments of the present principles. Part or all of processing system 100 may be implemented in one or more of the elements of systems 400 and 600 with respect to FIGS. 4 and 6.

Figure 5:
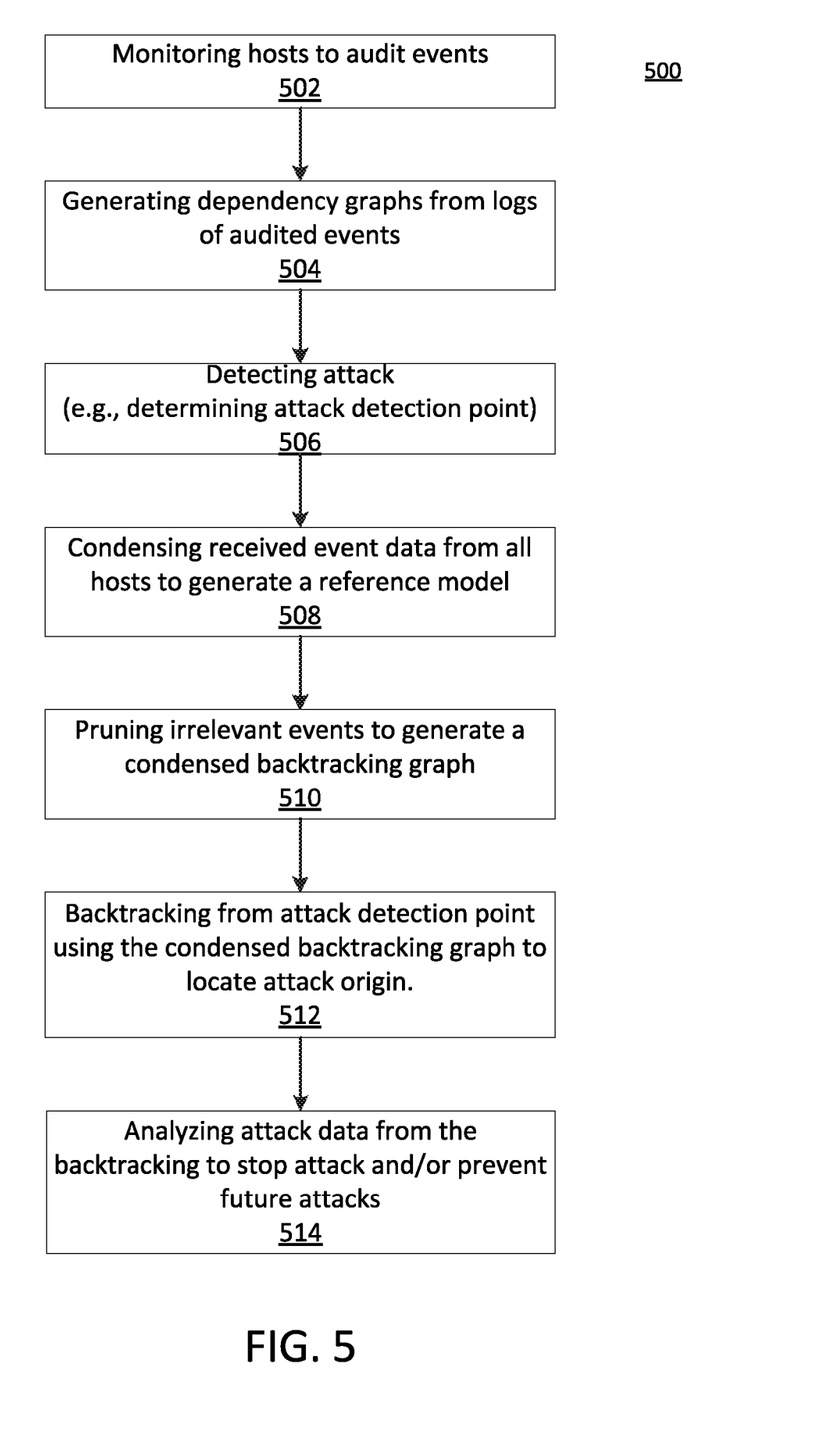
FIG. 5 shows an exemplary method for computer system security management using differential dependency tracking for a plurality of hosts in an enterprise, in accordance with an embodiment of the present principles.

Further, it is to be appreciated that processing system 100 may perform at least part of the methods described herein including, for example, at least part of method 500 of FIG. 5. Similarly, part or all of circuits/systems/networks 400 and 600 of FIGS. 4 and 6 may be used to perform at least part of the methods described herein including, for example, at least part of method 500 of FIG. 5.

Figure 2A:
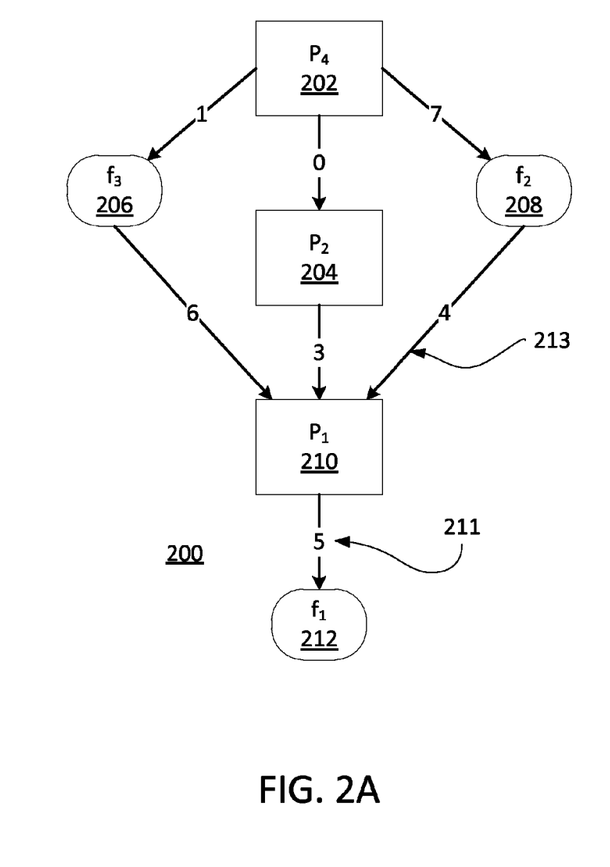
FIG. 2A shows an exemplary dependency graph for determining dependency relationships between resources across a plurality of hosts, in accordance with an embodiment of the present principles.

Referring now to FIG. 2A, an exemplary dependency graph 200 (DGraph) for determining dependency relationships between resources across a plurality of hosts is illustratively depicted in accordance with an embodiment of the present principles. In one embodiment, the DGraph 200 may be a directed graph for tracking dependency relationships between OS resources across hosts in an enterprise. In the DGraph, nodes 202, 204, 206, 208, 210, and 212 may represent a socket, pipe, file, or a process and edges 213 may represent a system call event. Direction of an edge depends on direction of data or control flow (e.g., process→file, file→process and parent→child represent a write, a read, and a fork system call, respectively).

In one embodiment, data flow may begin at process 202, and may follow edges 213 with time stamps of 0, 1, and/or 7, with the numerals 0, 1, and 7 representing timestamps (e.g., timestamps 1-7) for data flows. Blocks 206, 208, and 212 may represent files, while blocks 204 and 210 may represent processes according to the present principles.

In one embodiment, a detection point 211 is, for example, a point at which a suspicious file (e.g., malware process) is found on a host in an enterprise. After determining a detection point, a goal of backtracking according to the present principles may be to locate and/or exclude all processes and files upon which the detection point 211 is causally dependent. By gathering and compiling data from across all computing devices in a network (e.g., data collection across an enterprise) into a collection of all such causal dependencies (e.g., DGraph), a determination may be made or how the detection point was created (e.g., identifying the cause of an attack) according to the present principles. The DGraph 200 will be described in further detail herein below.

Figure 2B:
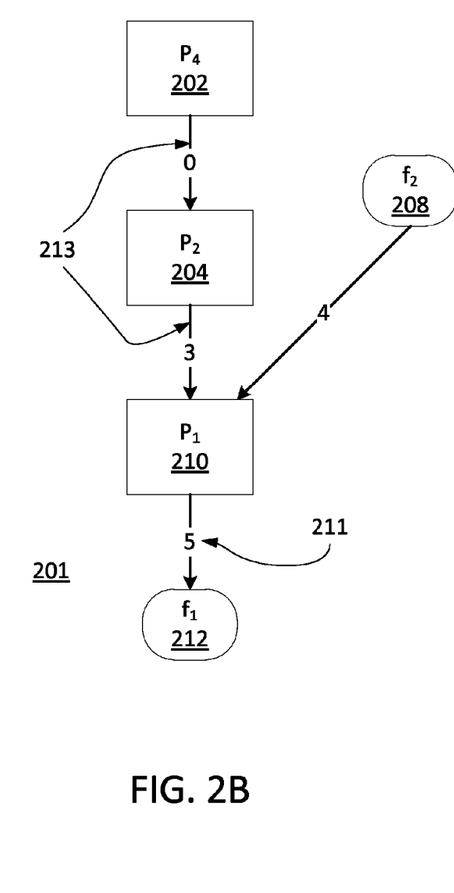
FIG. 2B shows an exemplary backtracking graph for detection and tracking of attacks across a plurality of hosts, in accordance with an embodiment of the present principles.

Referring now to FIG. 2B, with continued reference to FIG. 2A, an exemplary backtracking graph 201 for detection and tracking of attacks across a plurality of hosts is illustratively depicted in accordance with an embodiment of the present principles. In one embodiment, the backtracking method may transform/condense the data received (e.g., transform/condense the DGraph 200) to generate a condensed backtracking graph 201 which includes only events which lead up to a detection point 211 according to the present principles.

In one illustrative embodiment, the labels of the edges 213 of the DGraph 200 indicate the timestamp of the event (e.g., the time when the event occurred). The detection point 211, has a timestamp of 5 (in this example). Backtracking according to the present principles to $p_1$ 210 from the detection point 211 at timestamp 5 may add only $f_2$ 208 and $p_2$ 204 because they have timestamps less than 5. In the next step, backtracking from $f_2$ may not add any node to the backtracking graph because the timestamp of the edge between $p_4 \rightarrow f_2$ is 7, which is higher than timestamp of backtracked edge (e.g., edge with timestamp 4).

In one embodiment, backtracking from $p_2$ adds $p_4$ because the incoming edge to $p_2$ has a lower value of the backtracked edge. The backtracking graph 201 that is generated by collecting and transforming/condensing data (e.g., of a plurality of data types) from all nodes (e.g., computing systems) on a network (e.g., enterprise network) and outputting the results may be employed for locating the time and location of an attack, and may be employed to prevent any further attacks according to various embodiments of the present principles.

In various embodiments, the DGraph 200 may include many nodes and edges (e.g., thousands, millions, etc.), since even trivial applications generate many system calls. For example, a simple echo code in the python language triggers 819 system calls. Due to the numerous system calls, backtracking on the resulting DGraph 200 may create an extremely large (e.g., millions of nodes and edges) backtracking graph. A large backtracking graph such as this causes analysis for attack detection and prevention to be computationally intensive (and slow), and is essentially impossible for a system administrator to utilize for network analysis. For example, the backtracking graph of installing the GNU Compiler Collection (GCC) has 15,301 nodes and 197,670 edges, which. The size of a backtracking graph may also grow to be even more unmanageable by, for example, dependency explosion, sources of which will be described in further detail herein below with reference to FIGS. 3A-3D.

Figure 3A:
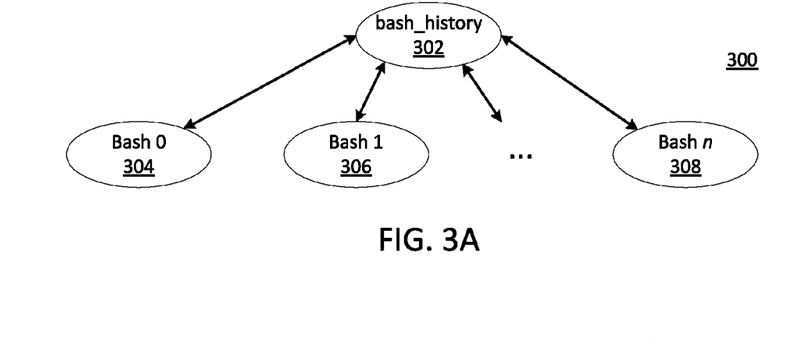
FIG. 3A-3D show exemplary sources of dependency explosion in a dependency graph, in accordance with an embodiment of the present principles.

Referring now to FIG. 3A, dependency explosion resulting from a "single file, multiple writers" source in a graph 300 (e.g., DGraph) is illustratively depicted in accordance with an embodiment of the present principles. In one embodiment, in a single file, multiple writers source, a file can act as a hub and "broadcast" to multiple processes. For example, a terminal may read from bash history 302 at startup, and may write to bash history 302 on exit. Thus, bash history 302 may appear to be a hub in the backtracking graph by which a new instance of a terminal is subsequently dependent on all previous instances (e.g., Bash 0 304, Bash 1 306 . . . Bash n). For example, in FIG. 3A, Bash$_n$ 308 depends on all previous instances of bash according to one embodiment of the present principles.

As an illustrative example, in a one week data trace of 10 desktop hosts, there may be 44,592 files with at least one reader and two writer processes which share this type of dependency through 8,051 unique files. An example in this group is xsession errors where graphical applications write error messages. To quantify the impact this source of dependency explosion, one week of data may be tracked, condensed, and analyzed to and locate the occurrences of this case. Then, for each occurrence, the backtracking method according to the present principles (described in further detail herein below) may be performed on, for example, a source node, and the number of nodes and edges in the resulting backtracking graph may be calculated. In some embodiments, a very large amount (e.g., more than 5K nodes and 15K edges) may be added to backtracking graph in the above case.

Figure 3B:
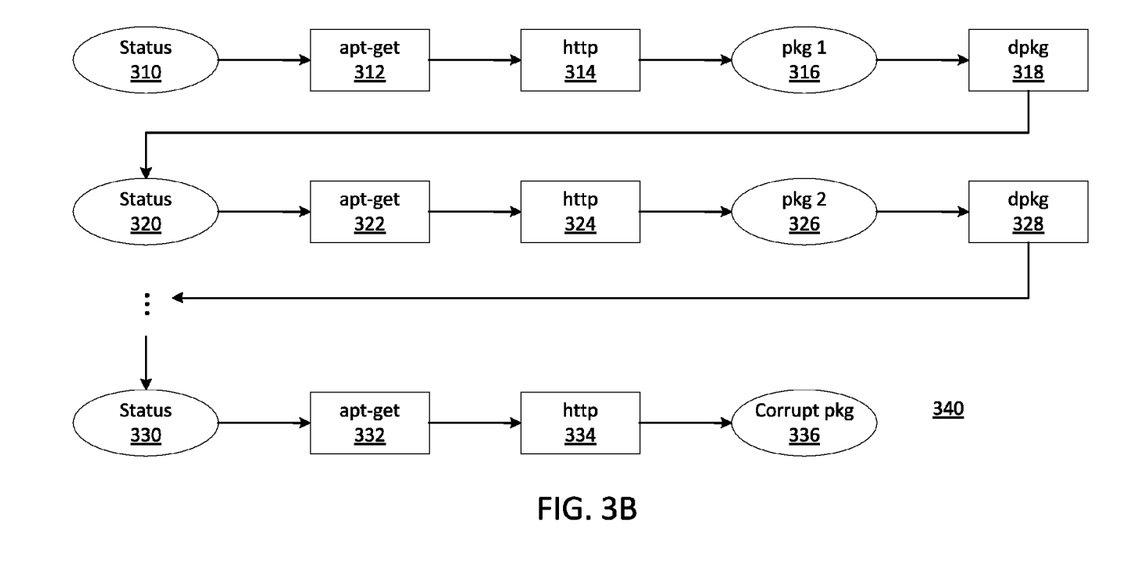

Referring now to FIG. 3B, dependency explosion resulting from a "repeated path" source in a graph 340 (e.g., DGraph) is illustratively depicted in accordance with an embodiment of the present principles. For example, installation of a package may depend on all previous package installations. In one embodiment, output of a path (e.g., 310→312→314→316→318) in a DGraph 340 may be input to next similar path (e.g., 320→322→324→326→328). For example, FIG. 3B shows a sub-graph for installing a package with apt-get 312. First, apt-get 312 checks the status of installed packages by reading the status file 310, and then it forks and executes an http process 314 to download the package 316. Next, dpkg 318 reads the package 316. After successful installation, the status file may be transformed into a new status file 320, and the next similar path (e.g., 320→322→324→326→328, 330→332→334→336) may be followed according to various embodiments.

In one embodiment, these interactions create a repeated paths dependency in which input of new path, dpkg 318, 328→apt-get 322, 332, depends on output of previous path, dpkg 318, 328→status 320, 330. The result of this dependency is that installing a new package depends on all previous installations. If only the newest package 336 is malicious, conventional backtracking includes all previous installations in the backtracking graph, which causes increased overhead and/or system slowdown.

Figure 3C:
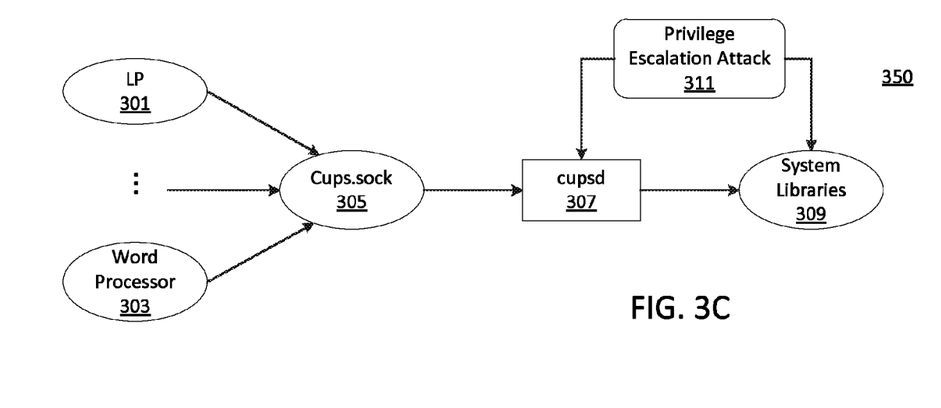

Referring now to FIG. 3C, dependency explosion resulting from a "Unix domain socket, multiple senders" source in a graph 350 (e.g., DGraph) is illustratively depicted in accordance with an embodiment of the present principles. In one embodiment, a Unix domain socket (UDS) 305 (e.g., Cups.sock) may cause a dependency explosion if multiple processes 301, 303 send a message through the UDS 305 to other processes (e.g., Common Unix Printing System Daemon (cupsd) 307). For example, in FIG. 3C, a dependency explosion occurs due to a UDS 305 shared by multiple processes 301, 303. The result is a dependency between cupsd 307 (Common Unix Printing System Daemon) and all other applications which ever printed a document such as lp 301 (e.g., a printing tool) and a word processor 303. As a result, if an attacker performs a privilege escalation 311 on cupsd and/or system libraries 309, and the attack is backtracked using conventional backtracking, the resulting backtracking graph includes the actions of all applications which ever printed a file, which causes increased overhead and/or system slowdown.

Figure 3D:
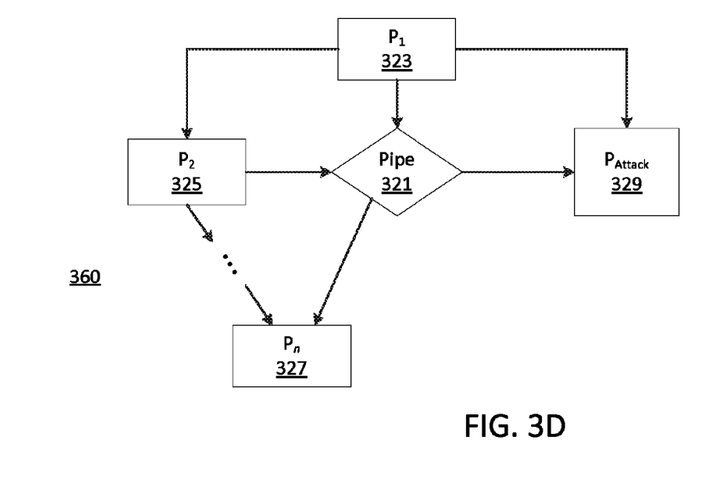

Referring now to FIG. 3D, dependency explosion resulting from a "single writers, multiple readers" source in a graph 360 (e.g., DGraph) is illustratively depicted in accordance with an embodiment of the present principles. In one embodiment, only one writer process 323 exists. This source might inflate the backtracking graph only a small amount, but the number of occurrence of this case is high e.g., echo python code has 175 files of this case in the backtracking graph. Most library files fall into this category: they are written to by an installer process 323 and then they are used by reader processes 325, 327, and 329, where 329 represents an attack process. As an example, /etc/hosts is a static lookup table for host names. It is accessed by every process which resolves an IP address. If an administrator modifies this file by an editor (e.g., Vim), all subsequent processes resolving an IP depend on Vim.

In one embodiment, a pipe 321, which is accessible only by the parent process 323 that creates the pipe and any of the parent processes descendant processes 325, 327, and 329. When the parent process 323 ends, a pipe 321 created by the process 323 can still be used by any existing descendant processes 325, 327, and 329 that have an open file descriptor for the pipe 321. This means all descendant processes 325, 327, and 329 of a process 323 share a parent's pipe 321 and they all become causally related. Thus, backtracking to a child process using conventional backtracking requires backtracking to all of its ancestor and sibling processes, which causes increased overhead and/or system slowdown.

It is noted that although the above scenarios are illustratively depicted to show examples of dependency explosion in a DGraph, this is not an exhaustive list, and there are a plurality of situations which may cause dependency explosion in networks (e.g., enterprise networks).

Referring now to FIG. 4, an exemplary system/method 400 for computer system security management using differential dependency tracking for a plurality of hosts in an enterprise is illustratively depicted in accordance with an embodiment of the present principles. In one embodiment, a network of interconnected computer systems 402 (e.g., enterprise network) may include monitors for detecting events and generating audit logs 405 (e.g., DGraphs), which may be fed into a big data security middleware 404 including an OS model 408, and OS events 410 may be sent to a tracker 412 and/or a reference model builder 414 according to the present principles.

In one embodiment, backtracking employs two inputs: the DGraph generated from audit logs 406 and the detected intrusion point 411. The DGraph, G=(N, E, τ), is the graph form of the system audit log 406 where N is set of OS objects, E is set of relations between objects, and r is a function mapping each edge to a timestamp. The Detection Point, d∈E, is an observed anomaly resulting from the attack, (e.g., a process accessing an attack specific file, or the execution of a suspicious process). In one embodiment, the output of backtracking is a sub-graph G'⊆G including only the events temporally related to the Detection Point 411. More specifically, G'=(N', E'τ), where η'∈N' is desired to reach d via a path of e'∈E', where each e' can temporally affect d.

In one illustrative embodiment, let head (e) be the node which edge e points to, and tail (e) be the node which e starts from (e.g., the source and sink nodes respectively of e). An event $e_0$ may be considered to be temporally related to e if there exists a path $$p = \text{tail}(e_0) \xrightarrow{e_0} n_0 \xrightarrow{e_1} \ldots \xrightarrow{e_j} n_j \xrightarrow{e} \text{head}(e),$$

such that for all i∈{0, . . . , j}, τ($e_i$)≤τ(e). Thus, p may be a path including only events which occur before or at the same time as e (e.g., they may temporally influence e) according to the present principles.

In one embodiment, after the initial detection point 411, a backward dependency track 413 may be determined, and pruning and backtracking may be performed in block 415 based on a relevancy score determined by the tracker reference model builder 414. The reference model builder 414 may include a path extractor 417 (e.g., for determining attack paths), a subject object relation determiner 419 (e.g., relevancy score determiner), and a frequency mapper 421 according to various embodiments of the present principles. The middleware 404 may be controlled either remotely or locally using a security intelligence console/controller according to the present principles. Further details of the tracker 412 and the reference model builder 414 will be described in further detail herein below.

Referring now to FIG. 5, with continued reference to FIG. 4, an exemplary method 500 for computer system security management using differential dependency tracking for a plurality of hosts in an enterprise is illustratively depicted in accordance with an embodiment of the present principles. In one embodiment, the present principles may be employed to transform and condense data received for all hosts in an enterprise (e.g., network) into a smaller file to generate a concise backtracking graph representing only essential steps involved in an attack for optimized speed and minimum processor requirements.

In one embodiment, to achieve ubiquitous auditing (e.g., auditing for all types of events for all hosts), a monitoring agent may be implemented and deployed to all participating hosts (e.g., systems) in an enterprise for monitoring hosts to detect and/or gather event data for all hosts in block 502. The monitoring agent may monitor the host activities using, for example, the host's (e.g., system's) built-in auditing mechanism (e.g., the Linux Auditing subsystem, which collects system call information of every process), and/or auxiliary information sources (e.g., the proc filesystem). The monitoring agents deployed for monitoring of the hosts may also perform a transformation on the collected events, and may report the event data to a central backend server in an aggregated and compressed format to, for example, increase transmission speed across the network, increase processing speed, reduce storage space, etc., according to various embodiments of the present principles.

In one embodiment, to ensure minimal resource and performance impact to the system being monitored, the monitoring agent may perform the monitoring in block 502 without recording, for example, snapshots of files or network messages, which greatly reduces the storage and network overhead. Furthermore, the monitoring agent may selectively monitor only a subset of system calls that have important security implications (e.g., predefined, or determined based on a security experts' domain knowledge according to the present principles. In addition, trade-offs may be made to improve monitoring overhead while keeping the accuracy at an acceptable level.

For example, from simple benchmarking, it may be determined by the monitoring in block 502 that read and write are among the most frequently used system calls. However, no read/write operations could occur on a file without a process opening it first, and the usage of open and close system calls may be over an order of magnitude less. Therefore, in some embodiments, only open and close system calls may be monitored in block 502, and the data operations may be inferred with slightly lower granularity and accuracy. Table 1 provides a list of system calls that may be monitored in block 502, classified into four categories. Overall, more than 70 system calls may be monitored, but for brevity, they are not all listed in Table 1 below:

TABLE 1

| Event Type | System Calls |
| --- | --- |
| Process | fork, vfork, clone, execve, exit, exit_group |
| Network | socket, bind, connect, accept |
| File | open, creat, link, unlink, mount, symlink, stat, access, dup, fcntl, close |
| IPC | pipe, socketpair, shmget, msgget, socket, bind, connect, accept |

In one embodiment, the monitoring agent may detect the same binary files for non-root users by a signature-based approach. This signature may be generated for all binary files, and a process may be identified by its loaded binary file, process identifier (PID) and/or start time of the process. Start time may be used as a part of identifier to prevent collision in PID recycling. If the monitoring agent is restarted (e.g., due to an update), the tracker 412 is still able to identify the same process by retrieving its stored start time according to the present principles.

In one embodiment, one or more dependency graphs (DGraphs) may be generated by a graph generator in block 504 by condensing and/or converting the audited events from all monitoring agents according to the present principles. The graph generator may include security relevant states of every OS object (e.g., processes, files, network connections, etc.) on each monitored host, and may model their state transitions across reported events using, for example, an OS model 408. The reported events 410 and state transitions may be converted into their corresponding graph elements and serialized into storage according to the present principles. The resulting graph will general be very large (e.g., thousands of events, millions of edges, etc.) according to various embodiments.

In one embodiment, a detection point of an attack (e.g., observed anomaly resulting from an attack) may be determined in block 506. In block 508, received event data may be transformed or condensed to generate a condensed reference model, and a relevancy function, r(e), may be calculated. A positive value may promote inclusion of a relevant event, while a negative value may encourage exclusion of an irrelevant event. To properly design and implement the relevancy function, the condensed reference model may first determine whether an event is relevant, and then may adjust the policy to include or exclude irrelevant edges according to various embodiments of the present principles.

A reference model builder may be employed in block 508 to automatically identify attack relevant events automatically using a scaleable and accurate method according to the present principles. The automatic method may employ the following observations and assumptions for identifying attack relevant events: (1) at any particular moment in time, the majority of hosts in an enterprise are unlikely to be compromised by an attacker. (2) events which occur frequently amongst all hosts in the enterprise are not likely relevant to an attack; and (3) an attack usually generates some rare events, especially during privilege escalation exploitations (e.g., an Apache server was compromised to spawn a shell, an operation it normally would not perform).

In one embodiment, monitoring in block 502 may be continuous for all enterprise hosts, the DGraph may be continuously updated (e.g., for new events, system changes, etc.), and the data may be fed into a frequent pattern miner. The frequent pattern miner, in turn, may extract information regarding frequently observed events and this information may be employed to produce a reference model in block 508. The reference model generated in block 508 may be used to derive a relevancy score for each edge. A specific threshold th may be used as the cutoff point for distinguishing relevancy, and the threshold may be pre-defined or defined during system operation. Any edge with a score below th may considered irrelevant to the attack according to various embodiments of the present principles.

In some embodiments, the design of the pattern miner and reference model generated in block 508 may include the following features, which may account for scalability, robustness, and data ambiguity. The frequent pattern miner may be built as follows: First, an event may be formally defined as the triple (s, e, d), where s and d are nodes and e is an edge. The triple may correspond to a subgraph in the DGraph:

$$s \xrightarrow{e} d.$$

Edges may be identified by their edge type (e.g., Read/Write, or ProcessCreate). Nodes may be identified by their path, (e.g., the location of the executable in the case of process nodes, or the location of the resource in the case of all other nodes). By identifying events in this way, actions (e.g., a process reading a specific file) may be aggregated and/or condensed, across all hosts in the DGraph according to the present principles.

Furthermore, the reference model generated in block 508 may be a map from an event to a frequency. To create the reference model, we iterate over each edge in the DGraph, obtain the source and destination node of the edge to build the event triple, and then increment the frequency of each event according to one embodiment of the present principles.

In one embodiment, a design challenge for building the reference model in block 508 is the massive size of most DGraphs (e.g., after a few weeks, the graph may include millions of nodes and billions of edges. Thus, the backtracking method according to the present principles may carefully balance scalability and accuracy so as to be practical for use. As such, when building the reference model, only subgraphs including two nodes and one edge may be considered to reduce the combinational complexity. Although considering larger subgraphs (and thus learning more specific patterns) could result in more accurate results such methods are difficult to scale to graphs with millions of nodes.

In one embodiment, with respect to robustness, a naive frequency counting/mapping 421 may be vulnerable to a data poisoning attack (e.g., the attacker could repeatedly execute malicious actions in order to increase their frequency in the DGraph). To handle this, in one embodiment, each host is allowed to increment the frequency of an event once per a user specified time window. This increases the difficulty of making a malicious event appear normal (e.g., the attacker would have to frequently perform the event over a longer period of time and/or on many hosts). Ideally, the time window should be as long as possible (e.g., weeks or months) for maximum effectiveness.

In one embodiment, with respect to data ambiguity, pipes introduce a challenge. For example, because pipes are anonymous channels of communication, there is no way to identify a pipe like a path of a file. To handle this, when building the reference model in block 508 (and similarly when checking the relevancy of an edge), all outgoing edges to a pipe may be connected to all incoming edges of the pipe. As a result, the pipe itself is ignored and we are left with direct read/write edges between processes. This results in an identifiable representation of the pipe between the two processes according to the present principles.

In one embodiment, the reference model built in block 508 may include taking a DGraph as an input and creating the reference model of events. The DGraph may include all the inter-connected events the hosts performed, and a database may be employed to store rules in the reference model. The graph may then be abstracted by aggregating edges. Specifically, we combine edges which are from different system calls but have similar semantics. This abstraction not only reduces the complexity of the graph, making subsequent algorithms operating on it more efficient, but also makes the backtracking graph easier to comprehend by the end-user, and reduces storage and bandwidth overhead according to the present principles.

In one embodiment, the edges may be defined as follows:
(1) Read/Write: An edge P→R represents process P writing to resource R (conversely, P←R is the analogous case for a read);
(2) FilexEixec: A special case of a read: P←R represents process P loading the binary R into its memory space;
(3) ProcCreate: An edge P1→P2 represents process P1 creating process P2; and
(4) ProcCreateInherit: An edge P→R indicates that process P inherited resource R from its parent with write permissions (conversely, P←R is the analogous case inheriting a R with read permissions).

In one embodiment, given the relevancy information, naïve (e.g., local-greedy) policies for handling irrelevant events may not produce acceptable results. For example, one may be tempted to assign negative infinity as a relevancy score for all irrelevant events. However, doing so would exclude all relevant events that are not directly reachable from each other, which would cause false negatives for a majority of attacks. Alternatively, assigning zero as relevancy score for all irrelevant events effectively eliminates the optimization goal and reverts the problem back to the original backtracking.

In one embodiment, a previously defined temporal constraint includes a simple non-local greedy policy for identifying irrelevant events and pruning them to generate a condensed backtracking graph in block 510. A parameter $k \in [1, \infty]$, which may be controllable by the user, may be defined. An edge e is included in the backtracking graph if there exists a path $$p = \text{tail}(e_0) \xrightarrow{e_0} n_0 \xrightarrow{e_1} \ldots \xrightarrow{e_j} n_j \xrightarrow{e} \text{head}(e)$$

such that the following conditions hold:
(1) $i \in \{0, \ldots, j\}$, $\tau(e_i) \leq \tau(e)$, which may indicate that all events in p occur before or at the same time as e
(2) $r(e) \geq th$, which may indicate that a relevant edge may be reached from e; and
(3) the length of p is less than or equal to k.

The above conditions/constraints ensure that only edges which can reach a relevant edge within a path of size k are included in the graph. This not only prevents the issues with a local-greedy approach, but also prevents the inclusion of a relevant edge which can only be reached through a path including many irrelevant edges according to various embodiments of the present principles.

In one embodiment, the backtracking method using the condensed backtracking graph to locate an attack origin is performed in block 512. The method (hereinafter k-hop backtracking) according to one embodiment is described in Method 1 below:

| Method 1: |
|---|
| 1: function BACKTRACK(depGraph, source, k, th) |
| 2:    Let S be a stack of edges |
| 3:    Let $E_f$ be the set of all edges in the Backtracking Graph |
| 4:    $E_f \leftarrow \emptyset$ |
| 5:    S.PUSH(sourceEv) |
| 6:    while ¬S.EMPTY do |
| 7:        e ← S.POP |
| 8:        n ← e.SOURCE |
| 9:        $E_f \leftarrow E_f \cup e$ |
| 10:       for all i ∈ n.INCOMINGEDGES do |
| 11:          ev ← (i.SOURCE, i, i.DEST) |

-continued

Method 1:

```
12:         if RELEVANT(ev, th, k) then
13:             S.PUSH(i)
14:      return E_f
15:   function RELEVANT(ev, th, k)
16:      Let P be the set of all paths from ev of length k such that ∀p ∈
         P, τ (p) ≤ τ (ev)
17:      for all p ∈ P do
18:         if ∃e ∈ p | re ≥ th then
19:             return true
20:      return false
```

In one embodiment, the input to the algorithm is the DGraph (created by the monitoring agent), the source edge (the detection point found (e.g., by an administrator)), a value for k, and a maximum frequency threshold. Compared to previous backtracking methods, a major difference is the call to RELEVANT on line 12 to determine relevant functions. The function RELEVANT may be a depth limited search with depth k from the passed event, ev. It is an implementation of the non-local greedy constraints previously described. For each edge encountered during the depth limited search, if it is considered as relevant (based on the relevancy score, r) then the event ev is traversed upon during backtracking and added to the resulting backtracking graph. An edge is considered relevant if its corresponding frequency in the reference model is less than the specified threshold (th).

In some embodiments, there may be two concerns with Method 1: (1) finding an appropriate value of k, and (2) finding an appropriate frequency threshold (th). Intuitively, as the value of k increases, the size of the resulting backtracking graph increases as more potentially benign edges are added. As such, a larger k produces a more conservative analysis: the backtracking graph is larger but it is less likely to produce false negatives. The most conservative approach is to make k unbounded (e.g., any edge which can reach a suspicious edge is included in the graph). We refer to the unbounded search method as Secure pruner, and this may be employed to prune irrelevant events to generate a condensed backtracking graph in block 510. As for finding a good threshold value, during our evaluation we re-ran our experiments with varying values for the threshold. However, it is noted that changes in the threshold do not necessarily result in a large change in graph size.

In one embodiment, an issue with the k-hop backtracking method in block 512 is that an attacker can hide their actions behind a long chain of edges in the DGraph. As a result, the method may require a large k to notice the attacker's actions. It may be easy for the attacker to create a long chain of process creations. For example, the attacker could, before starting the actual attack, continuously fork shells inside of shells to create a long process-to-process chain. Anticipating this, during the k-hop backtracking method in block 512, edges between two processes may always be considered as suspicious according to the present principles. In block 514, the attack data from the backtracking in block 512 may be analyzed using, for example, dynamic program analysis, to stop the attack and/or prevent future attacks according to various embodiments of the present principles.

Referring now to FIG. 6, with continued reference to FIGS. 4 and 5, an exemplary system 600 for computer system security management using differential dependency tracking for a plurality of hosts in an enterprise is illustratively depicted in accordance with an embodiment of the present principles.

While many aspects of system 600 are described in singular form for the sakes of illustration and clarity, the same can be applied to multiples ones of the items mentioned with respect to the description of system 600. For example, while a single remote host monitor 610 is illustratively depicted, more than one remote host monitor 610 may be used in accordance with the teachings of the present principles, while maintaining the spirit of the present principles. Moreover, it is appreciated that the remote host monitor 610 is but one aspect involved with system 600 than can be extended to plural form while maintaining the spirit of the present principles.

The system 600 may include a bus 601, a remote host monitor 610, an intrusion/attack detector 620, a pattern miner 630, a data condenser/graph generator 640, a backtracker 650, a relevance determiner 660, a storage device 670, a reference model generator, and/or an attack preventer 690 according to various embodiments of the present principles.

In one embodiment, the remote host monitor/monitoring agent 610 may be implemented and deployed to all participating hosts (e.g., systems) in an enterprise for monitoring hosts to detect and/or gather event data for all hosts. The monitoring agent 610 may monitor the host activities using, for example, the host's (e.g., system's) built-in auditing mechanism (e.g., the Linux Auditing subsystem, which collects system call information of every process), and/or auxiliary information sources (e.g., the proc filesystem). The monitoring agents 610 deployed for monitoring of the hosts may also perform a transformation on the collected events, and may report the event data to a central backend server in an aggregated and compressed format to, for example, increase transmission speed across the network, increase processing speed, reduce storage space, etc., according to various embodiments of the present principles.

In one embodiment, an attack detector 620 may detect any attacks and/or determine an attack detection point according to the present principles. In one embodiment, the monitoring by the monitoring agent 610 may be continuous for all enterprise hosts, and a resulting DGraph may be continuously updated (e.g., for new events, system changes, etc.), and the data may be fed into a frequent pattern miner 630. The frequent pattern miner, in turn, may extract information (e.g., stored on a storage device 670) regarding frequently observed events, and this information may be employed by the reference model generator 680 to produce a reference model.

In one embodiment, a relevance determiner 660 may be employed during reference model generation, and the generated reference model may be used to derive a relevancy score for each edge. A specific threshold th may be used as the cutoff point for distinguishing relevancy, and the threshold may be pre-defined or defined during system operation according to various embodiments.

In one embodiment, a backtracker 650 may be employed to backtrack from the detection point to the attack, and an attack preventer may be employed to analyze attack data (e.g., path, location, type, etc.) to stop current attacks and/or to prevent similar future attacks according to various embodiments of the present principles. In one embodiment, the backtracking may be performed for one machine in an enterprise, and all other machines may be employed as a baseline. The one machine may be compared against the baseline machines (e.g., in different locations) to determine common events and/or rare events (e.g., which may be attacks).

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening 1/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer-implemented method for intrusion attack recovery, comprising:
    monitoring two or more hosts in a network to generate audit logs of system events;
    generating one or more dependency graphs (DGraphs) based on the audit logs;
    building a reference model, and determining a relevancy score for each of a plurality of edges of the DGraphs based on the reference model;
    pruning irrelevant events from the DGraphs to generate a condensed backtracking graph based on the relevance score, the pruning comprising:
        removing events from the DGraphs that are in paths exceeding a threshold length from an attack detection point, and
        removing resources determined to be unrelated to an attack; and
    backtracking from the attack detection point in the condensed backtracking graph to locate an origin.

2. The method of claim 1, wherein pruning irrelevant events further comprises removing events from the DGraphs that do not lead to a relevant event in a path from the attack detection point.

3. The method of claim 1, wherein pruning irrelevant events further comprises comparing events to a relevancy threshold.

4. The method of claim 3, wherein pruning irrelevant events further comprises removing paths having no event that exceeds a relevancy threshold.

5. The method of claim 1, wherein pruning irrelevant events further comprises removing events having an associated time that occurred after the attack detection point.

6. The method of claim 1, wherein determining the relevancy score for each of a plurality of edges comprises performing a depth-limited search.

7. A system for intrusion attack recovery, comprising:
    a remote host monitor configured to monitoring two or more hosts in a network to generate audit logs of system events and to generate one or more dependency graphs (DGraphs) based on the audit logs;
    a relevance determiner comprising a memory coupled to a processor, the processor being configured to build a reference model, to determine a relevancy score for each of a plurality of edges of the DGraphs based on the reference model, and to for pruning irrelevant events from the DGraphs to generate a condensed backtracking graph based on the relevancy score, the pruning comprising:
        removing events from the DGraphs that are in paths exceeding a threshold length from an attack detection point; and
        removing resources determined to be unrelated to an attack; and
    a backtracker configured to backtrack from the attack detection point in the condensed backtracking graph to locate an origin.

8. The system of claim 7, wherein the relevance determiner is further configured to remove events from the DGraphs that do not lead to a relevant event in a path from the attack detection point.

9. The system of claim 7, wherein the relevance determiner is further configured to compare events to a relevancy threshold.

10. The system of claim 9, wherein the relevance determiner is further configured to remove paths having no event that exceeds a relevancy threshold.

11. The system of claim 7, wherein the relevance determiner is further configured to remove events having an associated time that occurred after the attack detection point.

12. The system of claim 7, wherein the relevance determiner is further configured to perform a depth-limited search.

* * * * *